United States Patent [19]
McCullough et al.

[11] Patent Number: 5,608,735
[45] Date of Patent: Mar. 4, 1997

[54] LOGICAL TRANSFORM OPERATOR-BASED METHOD AND APPARATUS FOR EXTRACTING FRAMING PATTERN FROM SERIAL DIGITAL BIT STREAM

[75] Inventors: Jason F. McCullough, Madison; Clifford L. Hall, III, Brownsboro, both of Ala.

[73] Assignee: Adtran, Inc., Huntsville, Ala.

[21] Appl. No.: 530,891

[22] Filed: Sep. 20, 1995

[51] Int. Cl.$^6$ ........................................... H04J 3/06
[52] U.S. Cl. .......................................................... 370/513
[58] Field of Search ................................ 370/100.1, 110.1, 370/106, 105.1, 94.1, 82, 83, 77, 58.1, 105.2, 105.3, 105.4, 109; 375/368, 356, 366, 354

[56] References Cited

U.S. PATENT DOCUMENTS 5,517,505  5/1996  Buchholz et al. ...................... 370/106

*Primary Examiner*—Douglas W. Olms
*Assistant Examiner*—Dang Ton
*Attorney, Agent, or Firm*—Charles E. Wands

[57] ABSTRACT

A framing pattern detector comprises a multi-stage input store, an intermediate logic operator, and a decoder. As the serial bit stream is clocked through the input store, the intermediate logic operator subjects sequentially spaced apart bits to a prescribed logic function, and transforms these bits into a transformed bit pattern having a length less than that of the framing pattern. The decoder compares the transformed bit pattern with cyclically rotated versions of a prescribed multi-bit framing pattern template. In response to a match between the transformed pattern with any of the cyclically rotated versions of the template, the decoder identifies the framing pattern. If the decoder fails to detect a match, the clocking of the serial bit stream is adjusted until the decoder identifies the framing pattern.

38 Claims, 4 Drawing Sheets

| FRAME | Ft | Fs | Fb |
|---|---|---|---|
| 1 | 1 | | 1 |
| 2 | | 0 | 0 |
| 3 | 0 | | 0 |
| 4 | | 0 | 0 |
| 5 | 1 | | 1 |
| 6 | | 1 | 1 |
| 7 | 0 | | 0 |
| 8 | | 1 | 1 |
| 9 | 1 | | 1 |
| 10 | | 1 | 1 |
| 11 | 0 | | 0 |
| 12 | | 0 | 0 |

*FIG. 1*

| FRAME | BF | X-OR RESULT | |
|---|---|---|---|
| 1 | 1 | 1 | |
| 2 | 0 | 0 | |
| 3 | 0 | 0 | X-ORed |
| 4 | 0 | 1 | REPEATING 6 BIT PATTERN |
| 5 | 1 | 0 | (100101) |
| 6 | 1 | 1 | |
| 7 | 0 | 1 | |
| 8 | 1 | 0 | |
| 9 | 1 | 0 | X-ORed |
| 10 | 1 | 1 | REPEATING 6 BIT PATTERN |
| 11 | 0 | 0 | (100101) |
| 12 | 0 | 1 | |
| 1 | 1 | | |
| 2 | 0 | | |

*FIG. 2*

COMBINATIONS OF X-ORed REPEATING 6 BIT PATTERN

| COMBINATION: | 1 | 2 | 3 | 4 | 5 | 6 |
|---|---|---|---|---|---|---|
| | 1 | 1 | 0 | 1 | 0 | 0 |
| | 0 | 1 | 1 | 0 | 1 | 0 |
| | 0 | 0 | 1 | 1 | 0 | 1 |
| | 1 | 0 | 0 | 1 | 1 | 0 |
| | 0 | 1 | 0 | 0 | 1 | 1 |
| | 1 | 0 | 1 | 0 | 0 | 1 |

LOGICAL TRANSFORM OPERATOR-BASED METHOD AND APPARATUS FOR EXTRACTING FRAMING PATTERN FROM SERIAL DIGITAL BIT STREAM

FIELD OF THE INVENTION

The present invention relates in general to digital communication systems, and is particularly directed to a technique for identifying a predetermined bit pattern, respective bits of which are periodically distributed in a serial bit stream, for example a superframe bit pattern that is embedded in a superframe of digital telephone data signals.

BACKGROUND OF THE INVENTION

The transmission of digital data signals over a time division multiplexed (TDM) serial communications link, such as a T1 telecommunications link used to transport digitized telephone signals at a bit rate of 1.544 Mb/s, customarily involves the assembly of successive telephone channels into frames of multiple channels of digital data. For example, a typical DS1 frame contains twenty-four TDM telephone signalling channels, of eight bits per channel, plus a framing bit, for a total of 193 bits per frame. The frames are then assembled into superframes of twelve frames each, so that a respective superframe contains 288 multiplexed telephone channel time slots having an interleaved twelve bit superframe bit pattern of one superframe bit occurring every 193 bits of the superframe.

As diagrammatically illustrated in FIG. 1, a superframe bit pattern is a composite code pattern comprised of successive bits of a first, terminal frame pattern Ft, which are interleaved with a second, signalling frame pattern Fs. The terminal frame pattern Ft consists of an alternating pattern of '1's and '0's, and the signalling frame pattern Fs consists of three consecutive zero bits (000) followed by three consecutive one bits (111). Thus, interleaving the two frame patterns Ft and Fs produces the composite superframe bit sequence: 1-0-0-0-1-1-0-1-1-1-0-0.

Prior art schemes to locate a framing bit pattern, in order to effect regeneration of embedded clock signal and synchronize the receiver with the transmitter, so as to allow recovery of the serial data, typically analyze or operate directly upon the transmitted data. For example, the U.S. Patent to Jiang U.S. Pat. No. 4,730,346, which looks for an extended superframe (ESF) pattern, uses a hardware (memory) intensive scheme to load a plurality of successive extended superframes into memory, and then iteratively processes the stored data to find where the extended superframe pattern is located. Additional examples of framing pattern detection mechanisms may be found in the U.S. patents to Graves et al, U.S. Pat. No. 4,622,666, Hoogoveen, U.S. Pat. No. 4,347,606, and Susset, U.S. Pat. No. 3,940,563.

Notwithstanding their processing complexity, a particular shortcoming of such conventional framing pattern detection schemes is the substantial memory redundancy requirement for accommodating a sufficient number of successive frames that will ensure that no potential framing bit locations are missed. While such a brute force approach may be capable of achieving reasonably fast framing recovery, it is hardware intensive and therefore costly.

SUMMARY OF THE INVENTION

In accordance with the present invention, the above described shortcomings of conventional 'direct' analysis approaches to framing pattern synchronization are effectively obviated by taking advantage of an attribute of a framing pattern, such as a DS1 superframe pattern, that allows the use of an intermediate logic operator to transform the original transmitted framing pattern into a relatively short pattern template, and comparing this reduced length pattern template in a pattern decoder with cyclically redundant versions of itself, in order to locate the original framing bit pattern.

For a DS1 superframe pattern, the characteristics of the framing pattern itself and the transformed pattern template resulting from the logic operation on a DS1 framing pattern are such that the probability of random data causing the logic operator to produce the reduced length template associated with the twelve bit composite DS1 superframe bit sequence 1-0-0-0-1-1-0-1-1-1-0-0 is almost nil, thereby effectively guaranteeing that an indication of a framing pattern match by the pattern decoder is associated with a true framing pattern.

For a twelve bit, DS1 superframe pattern, which is comprised of two sequential complementary multiple bit sequences (100011–011100), the logic operator comprises a set of six exclusive-OR circuits for subjecting adjacent pairs of successive bits of one of these two complementary, multiple bit sequences, plus an adjacent bit of the framing sequence at either end of the sequence to an exclusive-OR function. For a valid DS1 framing pattern, the exclusive-OR function will produce the six bit reference template sequence: 100101 which, when decoded, indicates that the DS1 framing pattern has been located. Since the length of the transformed bit sequence template (100101) is only half that of the original twelve bit DS1 superframe sequence (100011011100), the complexity of the processing logic (number of gates) required to compare cyclically rotated versions of the six bit reference template is considerably reduced.

In accordance with a first embodiment of an architecture that may be used to implement the transform operator-based framing bit pattern detection of the present invention, front end shift resister delay and post delay decoder components similar to those employed in the direct pattern detector scheme described in the above-referenced Jiang patent are supplemented, by installing an exclusive-OR transform logic operator between the outputs of the cascaded delay registers and inputs to the decoder. In such an architecture, in order to provide sequential 193 bit offsets between successive framing bits of a DS1 superframe, six shift registers are connected in cascade between an input serial bit stream data link and a seventh input port of a seven input port exclusive-OR gate array. The exclusive-OR gate array has six additional input ports, which are respectively coupled to the inputs of the shift registers, and therefore receive the bit contents of the serial data link and the bit output of the last stage of each shift register.

For adjacent bit pair processing of successive bits of a DS1 superframe, the exclusive-OR gate array contains six, two-input exclusive-OR gates having their inputs successively connected to apply a respective exclusive-OR logic operation to each pair of successive bits provided by successive pairs of seven bit inputs from the input data link and the outputs of the shift registers. The outputs of the exclusive-OR gate array are coupled to a pattern decoder, which compares the outputs of the exclusive-OR gate array with cyclically rotated versions of the six bit reference template.

As an input serial data stream is clocked through the cascaded shift registers, under control of a recovered (DS1) clock, successive bits of the serial data stream are processed by the exclusive-OR gate array and the decoder. If a match between any of the cyclically rotated versions of the six bit template and the outputs of the exclusive-OR gate array is detected, the decoder generates a pattern detected output signal, so as to identify the location of the superframe bit pattern in the input data stream.

In accordance with a second, and preferred embodiment of the invention, the fairly substantial amount of memory employed in the architecture of the first embodiment is reduced by replacing the (193 bit delay) shift registers with single bit flip-flops. The outputs of the flip-flops are respectively coupled to the input ports of the exclusive-OR gate array. The rest of the pattern detector, except for the clocking of the respective flip-flop stages, is the same as that of the first embodiment. Because each flip-flop provides only a single stage of delay, it is necessary to clock the flip-flops at $1/193$ of the bit clock rate of the serial data stream and controllably slip the clock signal by one bit time for each failure to detect a pattern match. In the course of incrementally slipping the clock signal by one clock bit, the template decoder will eventually detect a pattern match, and provide an output, identifying the location of the superframe bit pattern in the monitored serial input data stream.

An additional benefit of the present invention results from the fact that the six bit template produced by the exclusive-OR logic operator in response to the superframe (SF) bit pattern is the same six bit sequence of which an extended superframe (ESF) sequence is comprised. This duality feature allows the signal processing hardware requirements of pattern detection circuitry that is to be used for both superframe (SF) and extended superframe (ESF) applications to be reduced. For example, the SF-detecting exclusive-OR transform operator may be combined with the ESF-detecting front end of an ESF pattern detector, such as that described in the above-referenced '346 patent to Jiang, and using a single pattern decoder logic circuit, to detect the template pattern 001011.

BRIEF DESCRIPTION OF THE DRAWINGS

FIG. 1 diagrammatically illustrates a superframe composite code pattern comprised of successive bits of a terminal frame pattern Ft interleaved with a signalling frame pattern Fs;

FIG. 2 diagrammatically illustrates the application of the exclusive-OR logic operator mechanism of the present invention to transform the composite superframe bit pattern of FIG. 1 into a reduced length template;

DETAILED DESCRIPTION

Figures 3, 4:
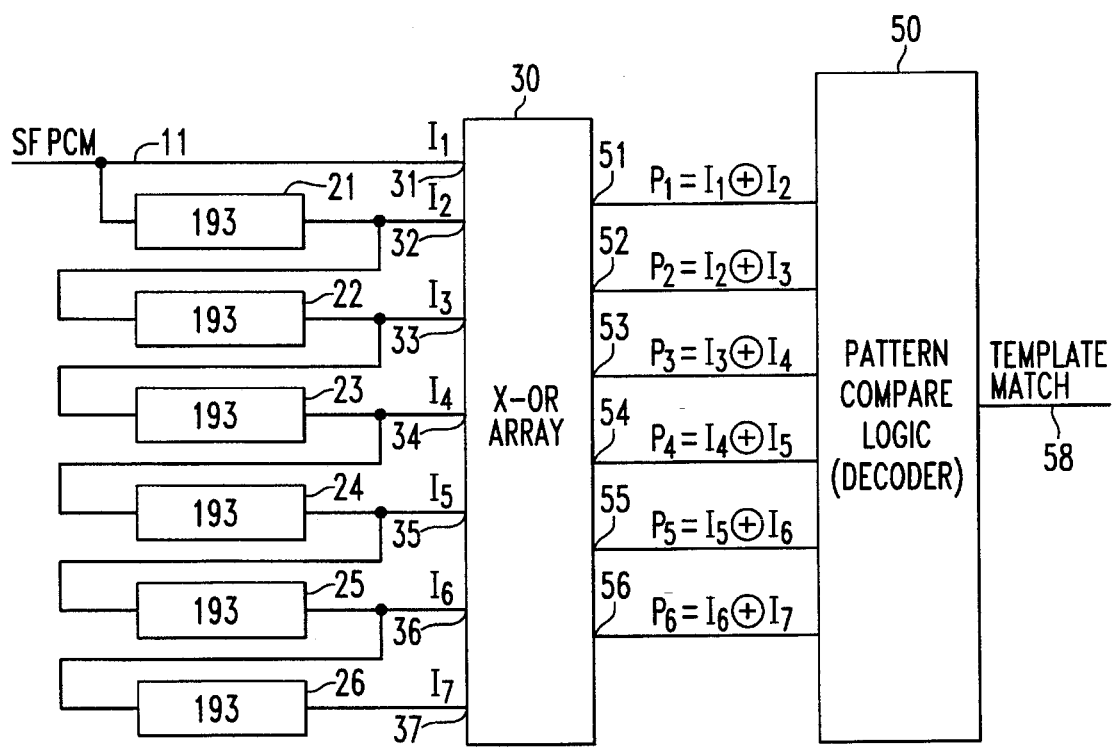
FIG. 3 diagrammatically tabulates cyclically rotated versions of the six bit template of FIG. 2.
FIG. 4 diagrammatically illustrates an architecture that may be used to implement the transform operator-based framing bit pattern detection in accordance with a first embodiment of the present invention.

Before describing in detail the improved logic transform-based framing pattern detector of the present invention, it should be observed that the present invention resides primarily in what is effectively a prescribed set of conventional telecommunication signalling hardware components and attendant control circuitry therefor. Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

For purposes of describing an illustrative embodiment, the following description of the present invention will detail its application to the above-mentioned framing pattern sequence 1-0-0-0-1-1-0-1-1-1-0-0, employed for DS1 superframes of a digital telecommunication network. It should be understood, however, that such a digital bit sequence described herein is merely an example and is not to be considered as the only framing pattern capable of being processed in accordance with the principles of the invention.

FIG. 2 diagrammatically illustrates the application of the exclusive-OR logic operator mechanism of the present invention to the composite DS1 superframe bit pattern of FIG. 1 so as to transform that DS1 superframe pattern into a reduced length template which, as noted above, will facilitate bit comparison processing to identify the presence of the original superframe pattern in a received serial bit stream of DS1 digital data. As shown in the Figure, when immediately successive bits of the superframe bit sequence (1-0-0-0-1-1-0-1-1-1-0-0) are subjected in pairs to exclusive-OR logic operations, what results are two successive six bit patterns of the same sequence: 100101.

Namely, examination of the contents of the DS1 superframe bit sequence (1-0-0-0-1-1-0-1-1-1-0-0) reveals that it is comprised of two successive complementary six bit patterns (100011) and (011100). Consequently, applying a respective exclusive-OR logic operation to each pair of successive bits of each of these complementary six bit patterns, plus an adjacent bit of the framing sequence at either end of each pattern, for a total of seven bits per combined exclusive-OR operator set, will produce the same six bit sequence: 100101.

Since the length of the resulting transformed bit sequence template (100101) is only half that of the original twelve bit superframe sequence (100011011100), the complexity of the processing logic (number of gates) required to compare cyclically rotated versions of the six bit template, as diagrammatically tabulated in FIG. 3, is considerably reduced. In addition, the mathematical probability of random data within a serial bit stream being transformed by the set of six exclusive-OR circuits into this reduced length template (100101) representative of the twelve bit DS1 superframe sequence is only 0.78 percent. As a consequence, using the logic operator to effect a precursor transformation of the serial bit stream enables the present invention to provide a very practical and efficient signal processing mechanism for achieving framing bit recovery.

FIG. 4 diagrammatically illustrates an architecture that may be used to implement the transform operator-based framing bit pattern detection in accordance with the present invention. This architecture employs front end and downstream decoder components similar to those employed in the direct pattern detector scheme described in the above-referenced Jiang patent, but installs an exclusive-OR transform logic operator between the outputs of the cascaded delay registers and inputs to the decoder.

More particularly, the framing pattern detection architecture of FIG. 4 comprises an input link 11 over which the serial data stream containing the (DS1 superframe) pattern to be detected is supplied. As described briefly above, for the case of a DS1 superframe, for every 193 bits of the serial bit stream on link 11, there will be 192 data bits (associated with twenty-four, eight-bit channels, the values of which bits are arbitrary), plus a framing bit (corresponding to one of the framing bits Fb of the twelve bit sequence shown in FIG. 1).

Since, as explained above with reference to FIG. 3, the twelve bit superframe pattern can be detected by subjecting any successive seven framing bits within the twelve bit superframe pattern to exclusive-OR processing of successive pairs of the seven bits, it is necessary to provide six sequential full frame (193 bit) offsets, that will allow equivalent framing bit positions, spaced apart from one another by 193 bits, to be iteratively applied to an exclusive-OR transform operator.

In the architecture of FIG. 4, these sequential offsets are effected by means of a set of six shift registers 21–26, connected in cascade between input link 11 and a seventh input port 37 of an exclusive-OR gate array 30. Exclusive-OR gate array 30 has six additional input ports 31–36, which are respectively coupled to the inputs of shift registers 21–26, and therefore receive the bit contents of link 11 and the bit output of the last stage of shift registers 21–25. The shift registers are clocked by the DS1 clock (not shown), so that successive bits of the DS1 serial bit stream are sequentially clocked through the cascaded arrangement of shift registers 21–26.

Exclusive-OR gate array 30 is comprised of a set of six, two-input exclusive-OR gates having their inputs successively connected as shown in the logic transform diagram of FIG. 3, described above, so as to apply a respective exclusive-OR logic operation to each pair of successive bits provided by successive pairs of the inputs 31–37. The outputs P1–P6 of the exclusive-OR gates of array 30 are coupled over output links 51–56 to a pattern decoder 50. Decoder 50 is comprised of a set of combinational logic, such as that customarily employed in digital signal processing systems, for comparing the bit contents of links 51–56 from exclusive-OR gate array 30 with the cyclically rotated versions of the six bit template, tabulated in FIG. 3. A non-limiting example of a set of combinational logic circuitry for implementing exclusive-OR gate array 30 and template pattern decoder 50 is shown in FIG. 5, to be described.

As the sequential bits of an input serial data stream on link 11 are clocked by a recovered DS1 clock signal through cascaded shift registers 21–26, sequentially spaced apart (by a 193 bit separation) bits of the serial data stream are processed by exclusive-OR gate array 30 and decoder 50. In response to detecting a match between any of the cyclically rotated versions of the six bit template with the outputs produced by array 30, template pattern decoder 50 generates a pattern detected output signal on output line 58, to identify the location of the original superframe bit pattern (100011011100) in the input data stream.

Figure 5:
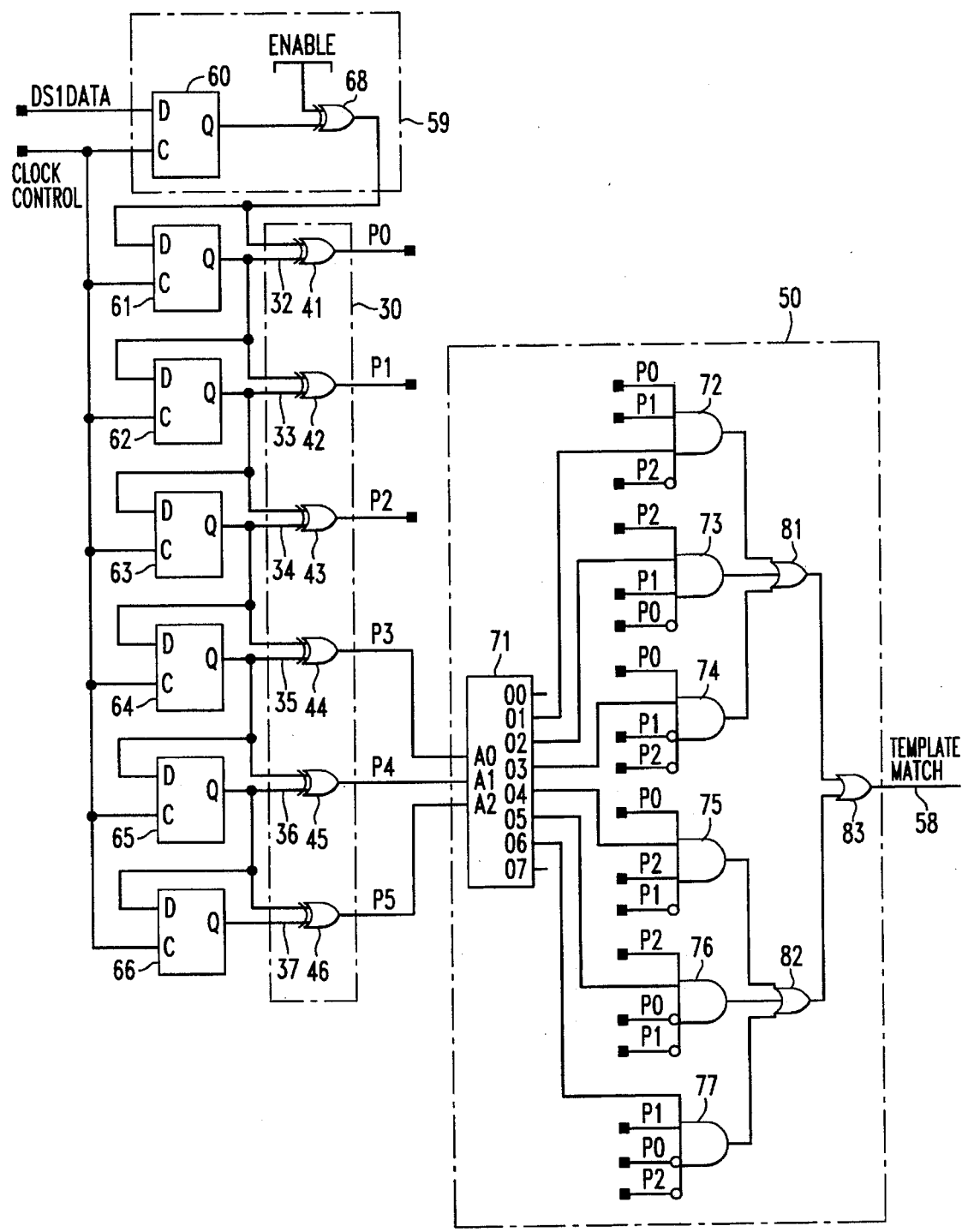
FIG. 5 diagrammatically illustrates an architecture that may be used to implement the transform operator-based framing bit pattern detection in accordance with a second embodiment of the present invention.

In accordance with a second, and preferred embodiment of the invention, diagrammatically illustrated in FIG. 5, the required memory (shift register) capacity of the architecture of the framing bit pattern detector of FIG. 4 is substantially reduced by replacing the (193 bit delay) shift registers 21–26 with single bit flip-flops 61–66, thereby significantly reducing the number of gates to implement the decoder just in the front end section. The outputs of the flip-flops 61–66 are respectively coupled to the input ports 32–37 of the exclusive-OR gate array 30, and the remainder of the circuitry, except for the clocking of the respective stages, is the same as in FIG. 4.

A preliminary stage 59 containing flip-flop 60 and exclusive-OR gate 68 is coupled in the input path for the DS1 serial stream and the flip-flop stages and exclusive-OR gate array 30. Gate array 30 is comprised of six exclusive OR-gate stages 41–46, with respective outputs P1–P6 being coupled to decoder 50. As shown, decoder is comprised of a demultiplexer 71, outputs of which are coupled to a set of AND gates 72–77, which are connected to outputs of selected ones of the exclusive-OR gates 61–66, in accordance with the template bit pattern. The outputs of the AND gates in turn are combined in OR gates 81–83, to derive the template pattern match output on line 58.

Because each flip-flop provides only a single stage of delay, it is necessary to clock the flip-flops at 1/193 of the bit clock rate of the serial data stream and controllably slip the clock signal by one bit time for each failure to detect a pattern match. In the course of incrementally slipping the clock signal by one clock bit, eventually decoder 50 will detect a pattern match, and provide an output on line 58, as described above.

As will be appreciated from the foregoing description, the present invention takes advantage of the logical symmetry of a DS1 superframe pattern that allows the pattern decoding process to be considerably simplified by the insertion of a logic operator, which transforms the original framing pattern that is periodically distributed in a serial stream of random data into a relatively short pattern template, which can then be readily compared in a simplified (six bit versus twelve bit) decoder logic with cyclically redundant versions of itself, to locate the framing bit pattern. As noted above, the characteristics of the twelve bit superframe pattern and the transformed pattern template resulting from the exclusive-OR logic operator on successive pairs of framing bits are such that the likelihood of random data causing the logic operator to produce the reduced length template associated with the above-referenced twelve bit composite superframe bit sequence 1-0-0-0-1-1-0-1-1-1-0-0 is only 0.78%, thereby effectively guaranteeing that an indication of a framing pattern match is that of a true framing pattern.

Because the six bit sequence (100101), or one of the cylically rotated versions thereof, that is produced by the exclusive-OR logic operator of the present invention in response to the superframe bit pattern (100011011100) is the same six bit sequence of which an extended superframe sequence is comprised, it is possible to reduce the signal processing hardware requirements of pattern detection circuitry that is to be used for both superframe (SF) and extended superframe (ESF) applications.

As a non-limiting example, the SF-detecting transform operator of the present invention may be combined with the ESF-detecting front end of the pattern detector described in the above-referenced '346 patent to Jiang, with the SF and ESF pattern detectors making use of the same pattern decoder logic circuit, which serves to detect the same template pattern 001011.

Figure 6:
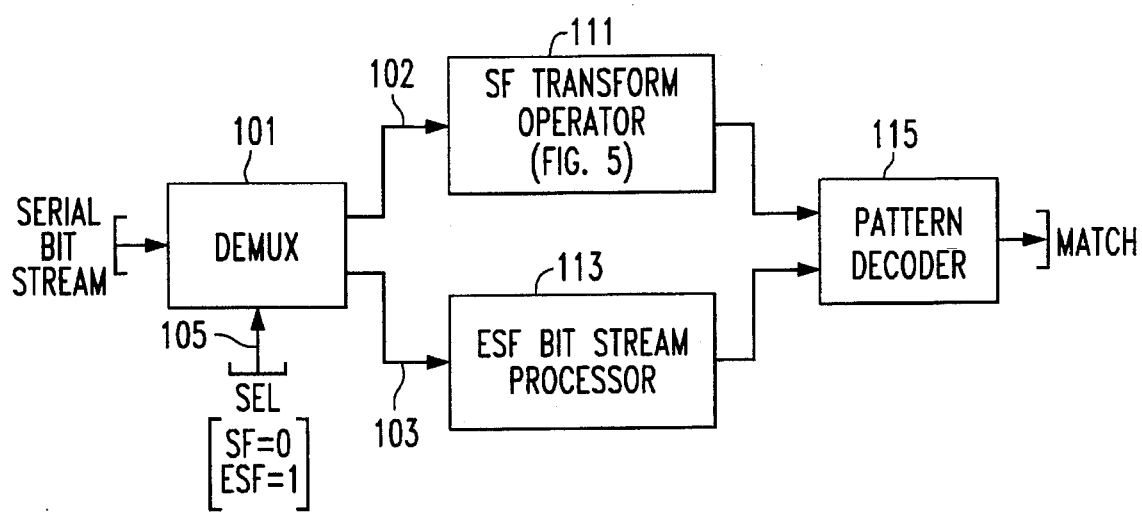
FIG. 6 diagrammatically illustrates a combined SF and ESF pattern detection arrangement.

Such a combined SF and ESF pattern detection arrangement is diagrammatically illustrated in FIG. 6 as comprising an input demultiplexer 101 to which the serial bit stream is coupled. Demultiplexer 101 has first and second output links 102 and 103 respectively coupled to an SF transform operator 111, corresponding to the transform operator portion of the pattern detection logic circuitry of FIG. 5, upstream of decoder 50, and to an ESF bit stream processor 113, corresponding to the front end of the ESF bit processing circuitry of the '346 patent upstream of the decoder 50. Since each of SF transform operator 111 and ESF bit processor 113 is operative to produce the same bit pattern (001011), each may be coupled to the same decoder 115 (which may correspond to decoder 50 in FIG. 5, for example). The select input 105 of demultiplexer 101 may be set by operation of a switch (not shown) mounted on a pattern detection chip package containing the two SF and ESF pattern detection circuits, so as to define whether superframe or extended superframe signals are to be processed.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of locating the position of a framing pattern comprised of a predetermined plurality of framing bits sequentially distributed throughout a serial bit stream comprising the steps of:

(a) processing a first plurality of bits of said serial bit stream, which are sequentially spaced apart from one another by successive separations corresponding to that of said framing bits as sequentially distributed throughout said serial bit stream, in accordance with a prescribed logic function, so as to transform said first plurality of bits into a transformed bit pattern, the length of which is less than that of said framing pattern;

(b) comparing said transformed bit pattern with cyclically rotated versions of a prescribed multi-bit pattern template that is obtained by processing said framing pattern by said prescribed logic function;

(c) in response to step (b) indicating a match between said transformed bit pattern with any of said cyclically rotated versions of said prescribed multi-bit pattern template, identifying said first plurality of bits of said serial bit stream as bits of said framing pattern; but, (d) in response to step (b) failing to indicate a match between said transformed bit pattern with any of said cyclically rotated versions of said prescribed multi-bit pattern template, repeating steps (a)–(c) for one or more additional pluralities of bits of said serial bit stream, which are sequentially spaced apart from one another by said successive separations corresponding to that of said framing bits as sequentially distributed throughout said serial bit stream, until step (c) identifies one of said one or more additional pluralities of bits of said serial bit stream as bits of said framing pattern.

2. A method according to claim 1, wherein said prescribed logic function is operative to subject immediately successive bits of said first plurality of bits of said serial bit stream in prescribed pluralities to identical logic operations, so as to transform said first plurality of bits into said transformed bit pattern.

3. A method according to claim 1, wherein said prescribed logic function is operative to subject immediately successive bits of said first plurality of bits of said serial bit stream in prescribed pairs to exclusive-OR logic operations, so as to transform said first plurality of bits into said transformed bit pattern.

4. A method according to claim 1, wherein said framing pattern is comprised of complementary multiple bit sequences.

5. A method according to claim 4, wherein said prescribed logic function is operative to transform each of said complementary multiple bit sequences of said framing bit pattern into said prescribed multi-bit pattern template.

6. A method according to claim 5, wherein said prescribed logic function is operative to subject immediately successive bits of said first plurality of bits of said serial bit stream in prescribed pairs to exclusive-OR logic operations.

7. A method according to claim 1, wherein said framing pattern comprises a twelve bit DS1 superframe pattern.

8. A digital signal processing arrangement for locating the position of a framing pattern containing a predetermined plurality of framing bits sequentially distributed throughout a serial bit stream comprising:

a multi-stage input store through which said serial bit stream is controllably clocked;

a logic operator coupled to said multi-stage input store and being operative to process a first plurality of bits of said serial bit stream, which are sequentially spaced apart from one another by successive separations corresponding to separations of sequentially distributed framing bits throughout said serial bit stream, in accordance with a prescribed logic function and thereby transform said first plurality of bits into a transformed bit pattern, the length of which is less than that of said framing pattern;

a framing pattern decoder coupled to said logic operator and being operative to compare said transformed bit pattern with cyclically rotated versions of a prescribed multi-bit framing pattern template that is obtained by processing said framing pattern by said prescribed logic function, said framing pattern decoder, in response to detecting a match between said transformed bit pattern with any of said cyclically rotated versions of said prescribed multi-bit pattern template, identifying said first plurality of bits of said serial bit stream as bits of said framing pattern; and a clock controller, which is operative, in response to said decoder failing to indicate a match between said transformed bit pattern with any of said cyclically rotated versions of said prescribed multi-bit pattern template, to control the clocking of bits of said serial bit stream through said multi-stage input store, such that said logic operator processes one or more additional pluralities of bits of said serial bit stream, which are sequentially spaced apart from one another by said successive separations of sequentially distributed framing bits throughout said serial bit stream, until said framing pattern decoder identifies one of said one or more additional pluralities of bits of said serial bit stream as bits of said framing pattern.

9. A digital signal processing arrangement according to claim 8, wherein said prescribed logic function is operative to subject immediately successive bits of said first plurality of bits of said serial bit stream in prescribed pluralities to identical logic operations, so as to transform said first plurality of bits into said transformed bit pattern.

10. A digital signal processing arrangement according to claim 8, wherein said prescribed logic function is operative to subject immediately successive bits of said first plurality of bits of said serial bit stream in prescribed pairs to exclusive-OR logic operations, so as to transform said first plurality of bits into said transformed bit pattern.

11. A digital signal processing arrangement according to claim 8, wherein said framing pattern is comprised of complementary multiple bit sequences.

12. A digital signal processing arrangement according to claim 11, wherein said prescribed logic function is operative to transform each of said complementary multiple bit sequences of said framing bit pattern into said prescribed multi-bit framing pattern template.

13. A digital signal processing arrangement according to claim 12, wherein said prescribed logic function is operative to subject immediately successive bits of said first plurality of bits of said serial bit stream in prescribed pairs to exclusive-OR logic operations.

14. A digital signal processing arrangement according to claim 8, wherein said framing pattern comprises a twelve bit DS1 superframe pattern.

15. A method of processing a serial bit stream to detect a framing pattern comprised of a predetermined plurality of framing bits sequentially distributed throughout said serial bit stream comprising the steps of:

(a) providing a prescribed logic operator, which is operative to transform said framing bits into a prescribed transformed bit pattern, the length of which is less than that of said framing pattern; and (b) applying a first plurality of bits of said serial bit stream, which are sequentially spaced apart from one another by successive separations corresponding to that of said framing bits as sequentially distributed throughout said serial bit stream, to said prescribed logic operator, which, in response to said first plurality of bits being framing bits, produces said prescribed transformed bit pattern.

16. A method according to claim 15, wherein said prescribed logic function is operative to subject immediately successive bits of said first plurality of bits of said serial bit stream in prescribed pluralities to identical logic operations, so as to transform said first plurality of bits into said prescribed transformed bit pattern.

17. A method according to claim 15, wherein said prescribed logic function is operative to subject immediately successive bits of said first plurality of bits of said serial bit stream in prescribed pairs to exclusive-OR logic operations, so as to transform said first plurality of bits into said prescribed transformed bit pattern.

18. A method according to claim 15, wherein said framing pattern is comprised of complementary multiple bit sequences.

19. A method according to claim 18, wherein said prescribed logic function is operative to transform each of said complementary multiple bit sequences of said framing bit pattern into said prescribed transformed bit pattern.

20. A method according to claim 15, wherein said framing pattern comprises a twelve bit DS1 superframe pattern.

21. A method according to claim 15, wherein said prescribed transformed bit pattern comprises a six bit DS1 extended superframe pattern.

22. A digital signal processing arrangement for processing a serial bit stream to detect a framing pattern comprised of a predetermined plurality of framing bits sequentially distributed throughout said serial bit stream comprising:

a multi-stage input store through which said serial bit stream is controllably clocked; and a logic operator which is coupled to said multi-stage input store and which is operative to process a first plurality of bits of said serial bit stream, which are sequentially spaced apart from one another by successive separations corresponding to separations of sequentially distributed framing bits throughout said serial bit stream, in accordance with a prescribed logic function, said prescribed logic function, in response to said first plurality of bits being framing bits, producing a prescribed transformed bit pattern, the length of which is less than that of said framing pattern.

23. A digital signal processing arrangement according to claim 22, wherein said prescribed logic function is operative to subject immediately successive bits of said first plurality of bits of said serial bit stream in prescribed pluralities to identical logic operations, so as to transform framing bits into said prescribed transformed bit pattern.

24. A digital signal processing arrangement according to claim 22, wherein said prescribed logic function is operative to subject immediately successive bits of said first plurality of bits of said serial bit stream in prescribed pairs to exclusive-OR logic operations, so as to transform framing bits into said prescribed transformed bit pattern.

25. A digital signal processing arrangement according to claim 22, wherein said framing pattern is comprised of complementary multiple bit sequences.

26. A digital signal processing arrangement according to claim 25, wherein said prescribed logic function is operative to transform each of said complementary multiple bit sequences of said framing bit pattern into said prescribed bit pattern.

27. A digital signal processing arrangement according to claim 25, wherein said prescribed logic function is operative to subject immediately successive bits of said first plurality of bits of said serial bit stream in prescribed pairs to exclusive-OR logic operations.

28. A digital signal processing arrangement according to claim 22, wherein said framing pattern comprises a twelve bit DS1 superframe pattern.

29. A digital signal processing arrangement according to claim 22, wherein said prescribed transformed bit pattern comprises a six bit DS1 extended superframe pattern.

30. A digital signal processing arrangement for processing a serial bit stream to detect a selected one of first and second respectively different framing patterns, said first framing pattern comprised of a first predetermined plurality of framing bits sequentially distributed throughout said serial bit stream, said second framing pattern comprised of a second predetermined plurality of framing bits sequentially distributed throughout said serial bit stream, different from said first predetermined plurality of framing bits, comprising:

a first signal processing operator which is operative to process a first plurality of bits of said serial bit stream, which are sequentially spaced apart from one another by successive separations corresponding to separations of sequentially distributed framing bits of said first framing pattern throughout said serial bit stream, in accordance with a prescribed logic function, said prescribed logic function, in response to said first plurality of bits being framing bits of said first framing pattern, producing a first plurality of output bits corresponding to a prescribed transformed bit pattern, the length of which corresponds to said second framing pattern;

a second signal processing operator which is operative to derive a second plurality of output bits from said serial bit stream, which are sequentially spaced apart from one another by successive separations corresponding to separations of sequentially distributed framing bits of said second framing pattern throughout said serial bit stream; and a framing pattern decoder, which is coupled to compare one of said first and second pluralities of output bits, with cyclically rotated versions of said prescribed transformed bit pattern, said framing pattern decoder, in response to detecting a match between said one of said first and second pluralities of output bits with any of said cyclically rotated versions of said prescribed transformed bit pattern, identifying said one of said first and second pluralities of output bits as bits of one of said first and second framing patterns.

31. A digital signal processing arrangement according to claim 30, wherein said prescribed logic function is operative to subject immediately successive bits of said first plurality of bits of said serial bit stream in prescribed pluralities to identical logic operations, so as to transform framing bits into said prescribed transformed bit pattern.

32. A digital signal processing arrangement according to claim 30, wherein said prescribed logic function is operative to subject immediately successive bits of said first plurality of bits of said serial bit stream in prescribed pairs to exclusive-OR logic operations, so as to transform framing bits of said first framing pattern into said prescribed transformed bit pattern.

33. A digital signal processing arrangement according to claim 30, wherein said first framing pattern is comprised of complementary multiple bit sequences.

34. A digital signal processing arrangement according to claim 33, wherein said prescribed logic function is operative to transform each of said complementary multiple bit sequences of said first framing bit pattern into said prescribed bit pattern.

35. A digital signal processing arrangement according to claim 33, wherein said prescribed logic function is operative to subject immediately successive bits of said first plurality of bits of said serial bit stream in prescribed pairs to exclusive-OR logic operations.

36. A digital signal processing arrangement according to claim 30, wherein said first framing pattern comprises a twelve bit DS1 superframe pattern.

37. A digital signal processing arrangement according to claim 30, wherein said prescribed transformed bit pattern comprises a six bit DS1 extended superframe pattern.

38. A digital signal processing arrangement according to claim 30, wherein said second framing pattern comprises a six bit DS1 extended superframe pattern.

* * * * *